May 27, 1924.
H. J. FIENHOLD
SHAFT COUPLING
Filed March 14, 1923
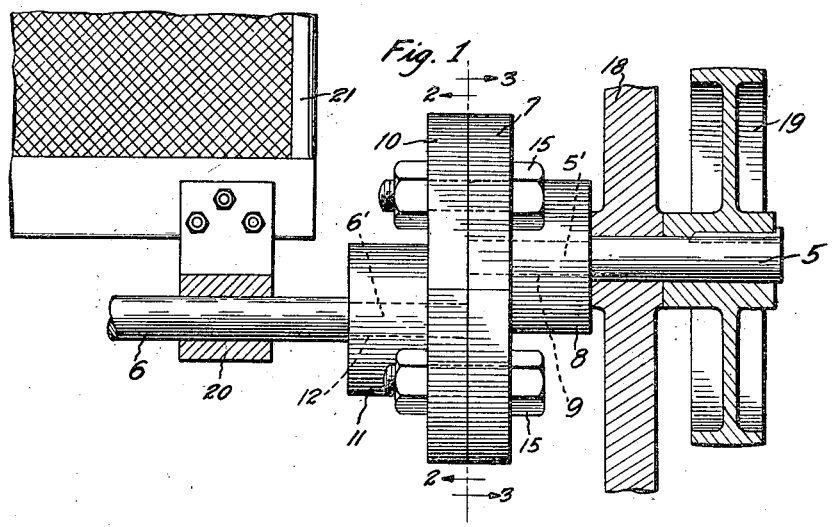
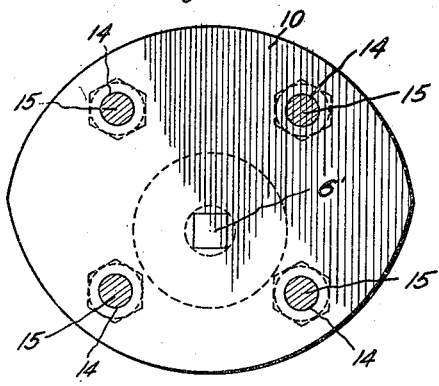
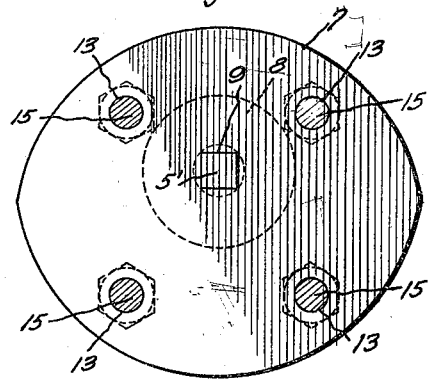

Patented May 27, 1924.

1,495,584

UNITED STATES PATENT OFFICE.

HARRY J. FIENHOLD, OF PONTIAC, ILLINOIS.

SHAFT COUPLING.

Application filed March 14, 1923. Serial No. 624,944.

*To all whom it may concern:*

Be it known that I, HARRY J. FIENHOLD, a citizen of the United States, residing at Pontiac, in the county of Livingston and State of Illinois, have invented certain new and useful Improvements in Shaft Couplings, of which the following is a specification.

This invention relates to an improvement in shaft couplings, and has reference more particularly to means for rigidly coupling a pair of shaft sections designed to be relatively offset laterally. One application or use for which the present invention is intended is that of a screen shaker shaft for such machines as oat bolters, but the invention may be employed in any other machine or relation where a shaft having relatively offset parts is employed.

In the accompanying drawing I have illustrated one practical and workable embodiment of my invention in which—

Fig. 1 is an elevation of my improved shaft coupling shown in connection with the frame and screen of an oat bolter;

Figs. 2 and 3 are inner face views of the two coupling members, and taken on the lines 2—2 and 3—3, respectively, of Fig. 1.

Referring to the drawing, 5 and 6 indicate a pair of shaft sections which are to be coupled in laterally offset relation. In the structure of Figs. 1, 2 and 3, the inner ends of said shaft sections, designated by 5' and 6', respectively, are squared. 7 designates a flat disc formed on its outer face with an eccentric hub 8 of substantial width, through the center of which hub is formed a square hole or socket 9 that is preferably continued through the disc 7. 10 designates a similar disc provided with a relatively wide eccentric hub 11, this latter being also formed with a square central hole or socket 12 also preferably continued through the disc 10.

In the discs 7 and 10 are formed a group of registering bolt holes 13 and 14 respectively grouped around the hubs 8 and 11, through which holes are passed fastening bolts 15, by which the discs are rigidly united face to face.

The squared end 5' of the shaft section 5 is fitted to and received within the square socket 9 of the disc 7 and its hub 8; and the squared end 6' of the shaft section 6 is similarly fitted to and received within the square socket 12 of the disc 10 and its hub 11.

It will be observed that the squared end sections of the shafts are reduced from the diameter thereof and are of the same length as the sockets in the discs and hubs which they engage. This construction affords a thrust bearing of the outer end of each hub against the shoulder at the base of the reduced shaft section, and also a bearing of the inner end of each reduced shaft section against the face of the opposed disc. These features contribute to make a very strong and rigid coupling in which there can be no endwise displacement of the discs and hubs relatively to the shafts or to each other, and makes unnecessary the provision of keys or other locking devices to maintain the coupling discs properly engaged with the shafts.

In Fig. 1 I have illustrated one practical application of the described structure, wherein the shaft section 5 is journaled in a side frame member 18 of an oat bolter and is equipped with a drive pulley 19, while the relatively offset shaft section 6 is journaled in a bearing bracket 20 attached to one end of a screen frame indicated at 21. This is but one illustrative application of the use of the invention. Manifestly it may be advantageously employed in many other relations where a shaft structure involving laterally offset rigidly connected shaft sections may be required.

I claim—

1. In a shaft coupling, the combination with a pair of shaft sections formed with reduced squared end portions, of a pair of flat discs having on their outer sides relatively offset eccentric hubs, said hubs and discs formed with central square sockets receiving and fitting the squared ends of said shaft sections, and fastening bolts grouped around said hubs and passed through and rigidly uniting said discs face to face.

2. In a shaft coupling, the combination with a pair of shaft sections formed with reduced squared end portions, of a pair of flat discs having on their outer sides integral diametrically offset eccentric hubs, said hubs and discs formed with central square sockets extending entirely therethrough of the same length as said squared end portions and receiving and fitting the latter, and a plurality of fastening bolts spaced at equal distances around said hubs and rigidly uniting said discs face to face.

HARRY J. FIENHOLD.